(12) United States Patent
McGrath et al.

(10) Patent No.: US 6,490,517 B1
(45) Date of Patent: Dec. 3, 2002

(54) FILTER METHOD FOR ENGINE SPEED TO VEHICLE SPEED RATIOS

(75) Inventors: Phillip B McGrath, Chelsea, MI (US); Yi Cheng, Ypsilanti, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/896,766

(22) Filed: Jun. 29, 2001

(51) Int. Cl.[7] ................................................. B60K 41/08
(52) U.S. Cl. ........................... 701/51; 701/54; 701/61; 477/109
(58) Field of Search ............................... 701/51, 52, 54, 701/61, 64, 66, 95; 477/109, 111, 46

(56) References Cited

U.S. PATENT DOCUMENTS

| | | | |
|---|---|---|---|
| 5,016,176 A | 5/1991 | Holbrook et al. ............ | 701/51 |
| 5,582,558 A | * 12/1996 | Palmeri et al. ............. | 477/109 |
| 5,974,354 A | 10/1999 | Janecke et al. ............. | 701/64 |
| 6,205,386 B1 | 3/2001 | Stroh et al. ................ | 701/51 |

* cited by examiner

Primary Examiner—William A. Cuchlinski, Jr.
Assistant Examiner—Arthur D. Donnelly
(74) Attorney, Agent, or Firm—Mark P. Calceterra

(57) ABSTRACT

The present invention relates to a method for determining a maximum performance gear for an automobile when performing acceleration/deceleration maneuvers and a system for enhancing a motor vehicle's gear indicator capabilities. More specifically, the present invention relates to a method for determining the optimal gear for operation of a manual transmission by obtaining vehicle speed and engine speed data and filtering such data through a mathematical filter implemented by a microprocessor. The application of the filter that may be adjusted throughout vehicle usage to optimize gear and transmission operability.

16 Claims, 4 Drawing Sheets

FILTER METHOD FOR ENGINE SPEED TO VEHICLE SPEED RATIOS

BACKGROUND OF THE INVENTION

1. Technical Field

The present invention relates generally to a method for determining optimal gear engagement for a motor vehicle, and more particularly to an improved filter method for processing the ratio of engine speed to vehicle speed.

2. Discussion

The ability to determine which gear a transmission should be engaged in is one of the most crucial tasks to master in order for a vehicle to operate correctly. The design of a manual transmission relies on the operator of the motor vehicle to determine the correct operable gear based on the vehicle speed and rpm measurements provided. In many cases, it is up to the skill of the operator to determine how to obtain the most efficient transition from gear to gear. Throughout a variety of acceleration/deceleration maneuvers, a transmission experiences a large amount of strain on the system.

In a typical power train system with a manual transmission, an increase in air flow occurs due to the operator's foot being on the throttle. The increase in air flow increases the torque output of the engine. This is a shock load on the dynamic vehicle system and causes the vehicle to oscillate back and forth or shake. Furthermore, if the throttle is opened too quickly it can be expected that the car will start to shake and ultimately stop on its own. It is because of these problems that it is necessary to develop a new type of technology for power trains that may reduce above-mentioned gear transition problems.

One approach to addressing gear transition problems is the use of an automatic transmission. Essentially, the automatic transmission takes the task of determining when a proper gear shift is necessary away from the vehicle operator. Instead, a computer controlled system is integrated with the transmission and upon obtaining vehicle feedback, the computer determines the appropriate time for gear changes. The smoothness of the gear transitions obtained by the automatic transmission results in an optimal environment for the operator of the vehicle while enhancing the operating conditions of the vehicle.

Therefore, it is desirable to develop a method and system for determining the optimal performance gear for a manual transmission that is similar to that of the automatic transmission. Currently, engine control software uses the ratio of engine speed to vehicle speed to determine the gear in which a manual transmission vehicle is operating. This approach does not result in a clean stable output when performing engine acceleration/deceleration maneuvers. Therefore, the usefulness of the engine speed to vehicle speed ratio as a gear indicator is compromised due to the "noise" that occurs during the gear output. In order to obtain a more stable output for gear feedback, a method for determining a continuous gear indicator system must be developed. It is also desirable to obtain a relatively simple operating system for a manual transmission which provides a more enjoyable atmosphere for the operator of the vehicle while decreasing the strain placed on the transmission.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

SUMMARY OF THE INVENTION

The present invention relates to a method for determining a maximum performance gear for an automobile when performing acceleration/deceleration maneuvers and a system for enhancing a motor vehicle's gear indicator capabilities.

One object of the present invention is to reduce the amount of "noise" present in the output which occurs during acceleration/deceleration maneuvers throughout transmission gear stages.

It is another object of the present invention to provide a filter for the engine speed over vehicle speed ratio which currently serves as the gear indicator system for a manual transmission.

It is still another object of the present invention to provide a filter that may be adjusted throughout vehicle usage to optimize gear and transmission operability.

In general, the present invention relates to a method of determining the optimal gear for operation of a manual transmission by obtaining vehicle speed and engine speed data and filtering such data through a mathematical filter implemented by a microprocessor.

Although the present invention has been desired on the basis of application with a manual transmission, the present invention may be applied to any sort of transmission which is not electronically controlled. This may include any automatic transmissions that are not electronically controlled by a computer, such as three-speed hydraulic engines.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The various advantages of the present invention will become apparent to one skilled in the art by reading the following specification and sub-joined claims and by referencing the following drawings, in which:

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
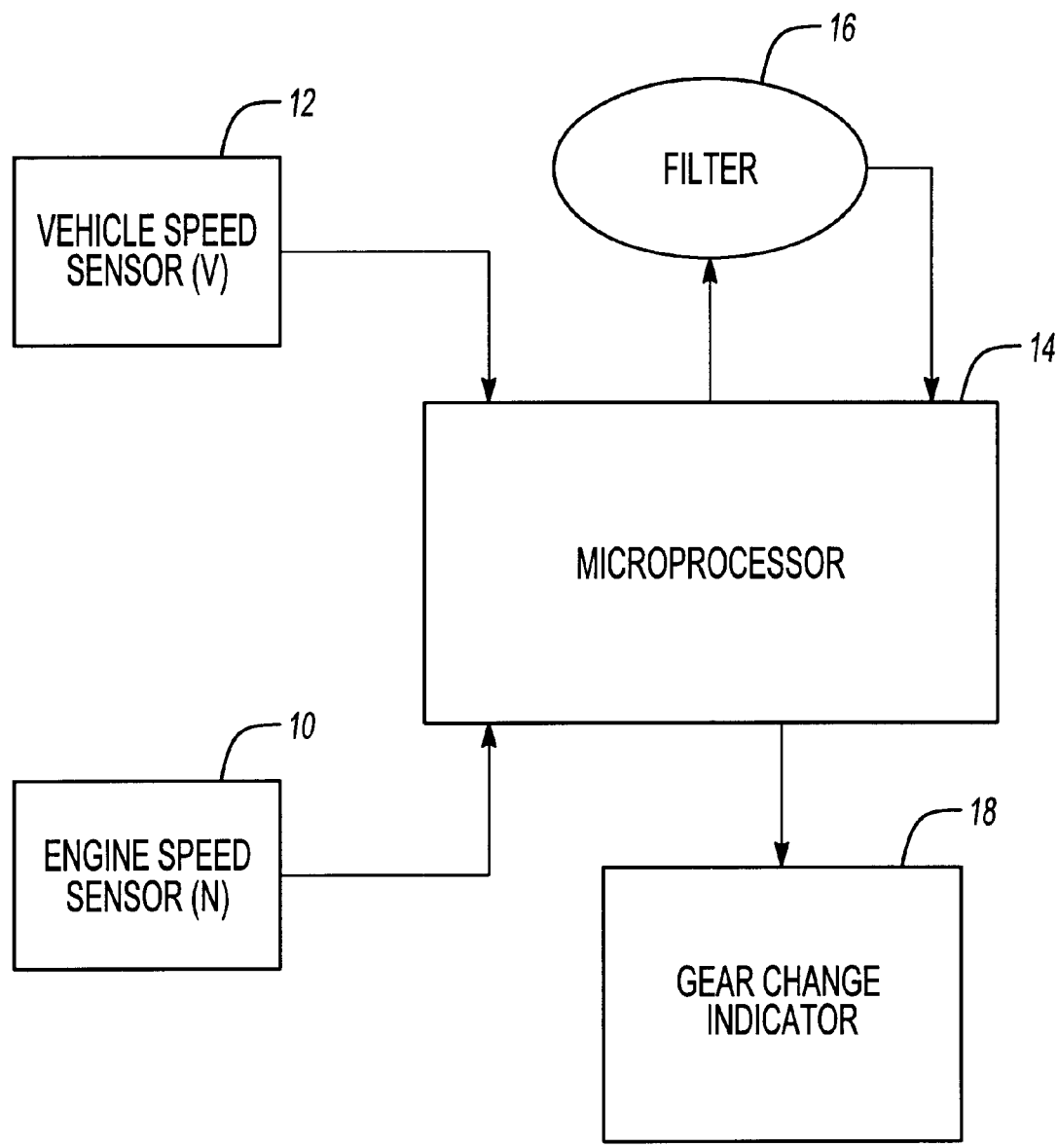
FIG. 1 is a schematic diagram of the present invention including key operating elements.

Referring first to FIG. 1, the systematic diagram of the key elements of the are shown. The key elements that are associated with the present invention include; an engine speed sensor 10, a vehicle speed sensor 12, a microprocessor 14, a filter 16, and if necessary, a device 18 for indicating the operating gear of the transmission to the operator of the motor vehicle.

It will be appreciated that prior to the application of the present invention, the vehicle speed (v) and the engine speed (n) of the motor vehicle must be determined. The vehicle speed of the automobile is determined by a vehicle speed sensor 12 positioned relative to a gear in the transmission. The sensor 12 therefore detects pulses from the gear in the transmission and converts the mechanical data provided by the gear into a vehicle speed measurement. An electrical signal which correlates to the vehicle speed is then sent to the microprocessor 14 to be interpreted. Similarly to the detection of the vehicle speed, the engine speed must initially be determined. The engine speed is determined by an engine speed sensor 10 positioned relative to the crank shaft of the engine. The engine speed sensor 10 processes pulses from the crank shaft and transfers the physical data to a representative electrical signal. The raw data from the engine speed sensor 10 and the vehicle speed sensor 12 are processed by the microprocessor 14 and the output data is provided as a "raw" engine speed (n) to vehicle speed (v) ratio. The engine speed to vehicle speed, or n/v, ratio is the fundamental basis of the present invention and moreover, is by which a manual transmission determines the selected gear of operation.

Upon processing the unfiltered engine speed to vehicle speed ratio, the representative electrical signal is sent to a filter 16. A more in-depth description of the filter routine is represented by the functionality flow chart in FIG. 2. In order to obtain a solid output during the acceleration/deceleration maneuvers within a selected gear, it is necessary to use a method to average out the signals being received. The present invention uses a first order lag filter to remove the unnecessary noise from the selected gear and to obtain a stable output when processing the selected gear output data. The preferred first order lag filter is represented by the following formula:

$$\text{filtered } n/v_{new} = [(\text{unfiltered } n/v) \times \text{filter constant}] + [(\text{filtered } n/v_{old}) \times (1 - \text{filter constant})]$$

Figure 3:
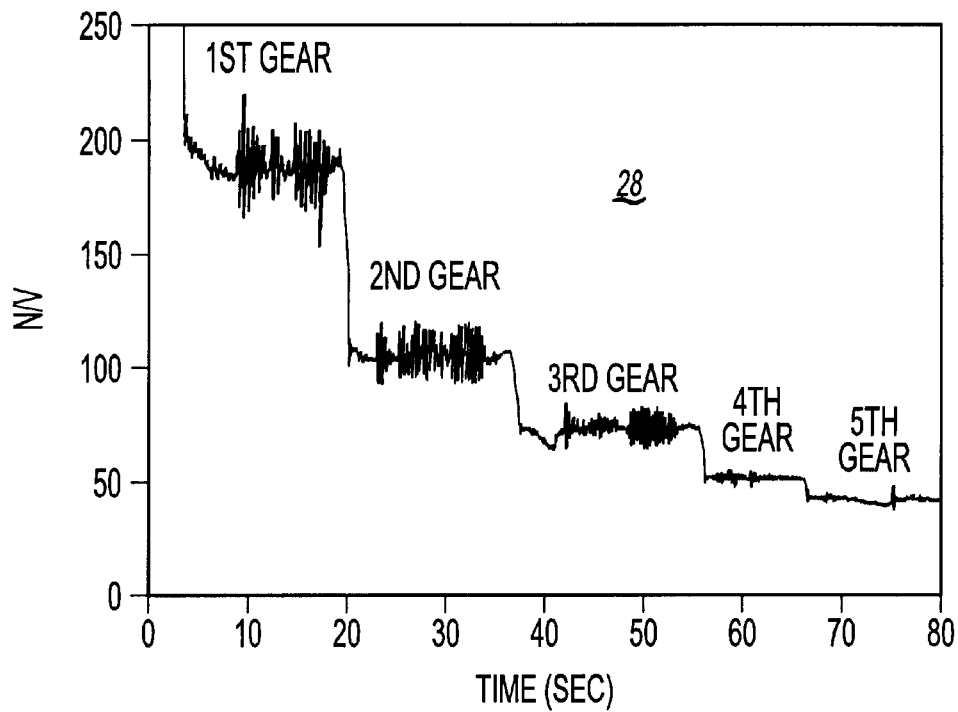
FIG. 3 is graph of a conventional N/V ratio for a manual transmission going from first gear to fifth gear, useful in understanding the present invention.

The filter constant is a value that is determined by the calibrator to obtain an appropriate filtered n/v value that is stable and conclusive. The object of the first order lag filter is to compress the noise present in selected gears, as can be seen in the graphical representation of the unfiltered n/v values in FIG. 3 at plot 28.

Figure 2:
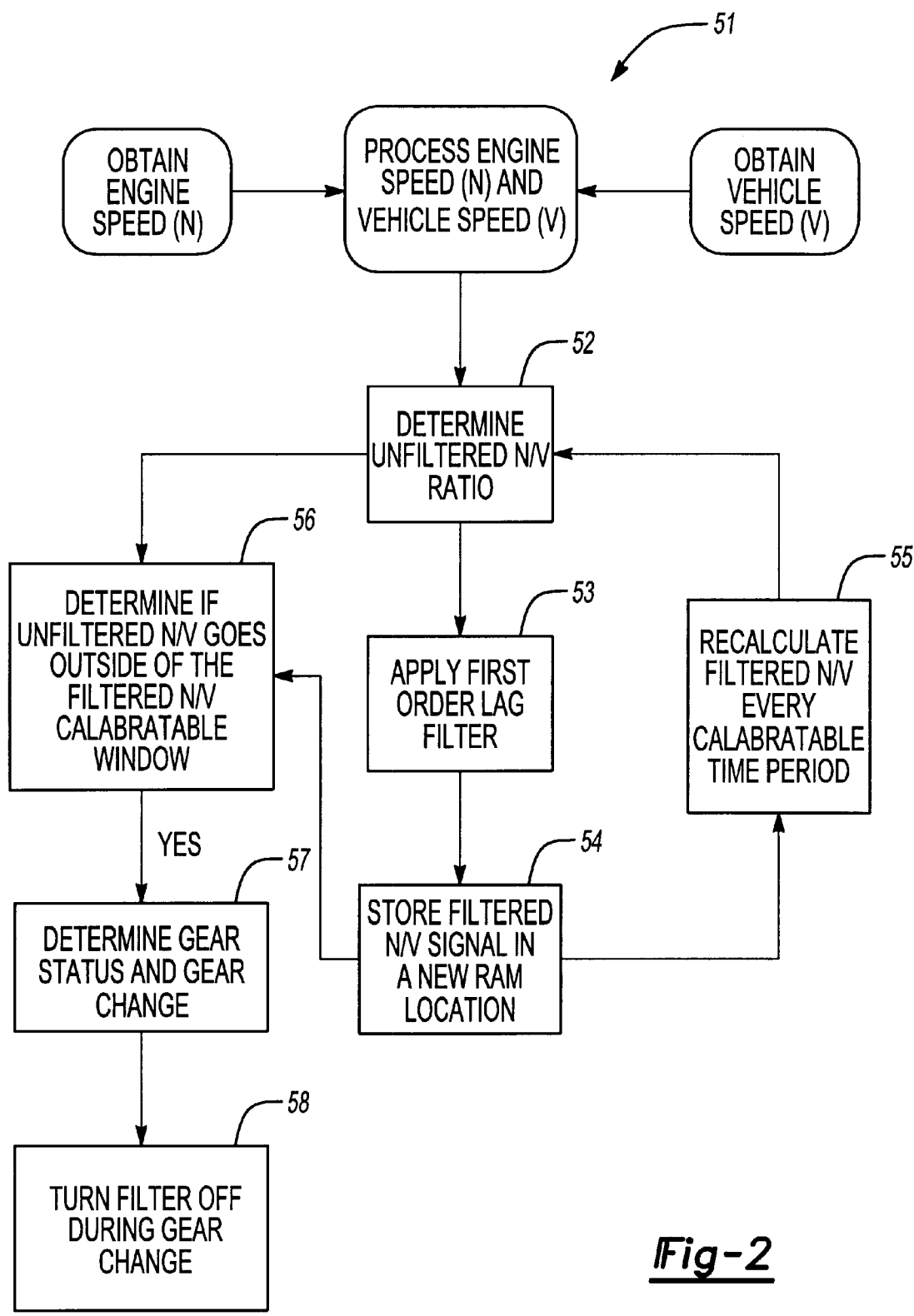
FIG. 2 is a functionality flow chart of the filter method and technique for operation.

Therefore, according to FIG. 2 the engine speed (n) and vehicle speed (v) are obtained and processed at step S1. The processing of the engine speed and vehicle speed result in a determination of an unfiltered engine speed to vehicle speed ratio at step S2 (unfiltered n/v ratio). At step S3 the first order lag filter is then applied to the unfiltered n/v ratio as described above. Following the application of the first order lag filter to the unfiltered n/v value, the filtered n/v value is processed and stored in a new RAM location at step S-4. The filtered n/v value is then recalculated every calabratable time period. Each information cycle takes approximately 12.5 milliseconds, also referred to as a 12.5 ms loop. The filtered n/v value may therefore be recalculated once every calabratable time period, or once every so many 12.5 ms loops. Each filtered n/v signal is then stored in a new RAM location for each selected gear that is in operation at the calabratable time period. The calabratable time periods may further be designed to have the filter applied every 12.5 milliseconds, but the results of the filtered n/v are only processed every specified calabratable time period. Thus, there may be a variety of time periods in which data is collected and stored.

The object of being able to select the specific calabratable time period for when the n/v ratio is filtered allows the calibrator to delay the calculation and slow down the output. This slowing down of the calculation results in a more average output overall and provides an improved gear indicator, as can be see in FIG. 4.

Figure 4:
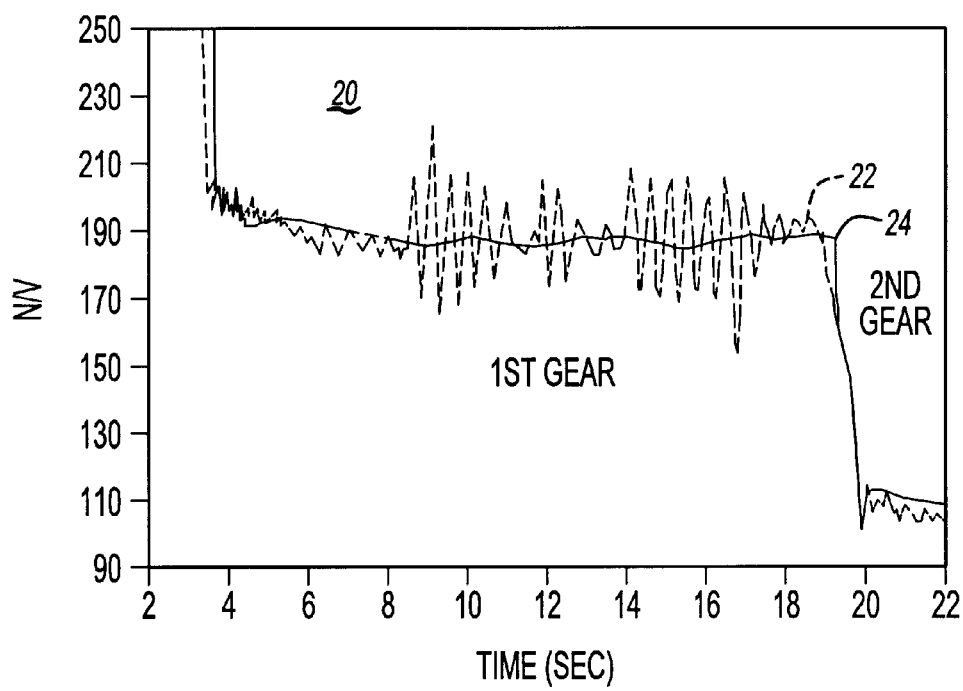
FIG. 4 is a graph of a filtered N/V ratio for a manual transmission in first gear.

The plot 20 of FIG. 4 is a graphical representation of the improved filter routine in comparison with the unfiltered n/v output data. More specifically, FIG. 4 is a graphical representation of the output which occurs in a 5 speed manual T350+ transmission throughout the operation of $1^{st}$ gear. A comparison of the unfiltered n/v ratio to the filtered n/v ratio is further provided. As represented by the dotted line, the unfiltered or "raw" n/v ratio output curve 22 exhibits a large amount of fluctuation within the first gear maneuvers. It can be seen that aggressive throttle movements are performed in each gear and the fluctuations of the throttle result in a large amount of "noise" in the unfiltered n/v ratio data signals. Following the application of the first order lag filter to the unfiltered n/v ratio, the filtered n/v ratio output curve 24 (represented by the solid line) demonstrates a much more stable data output signal. The stable output signal that is provided by the filtered n/v ratio allows for a clear determination of the operational gear and causes less strain on the transmission system. This type of data management system is desirable throughout the operation of the transmission because less data must be interpreted and a more solid gear determination is possible.

Although not currently applied, a 2-D table may be incorporated within this system to provide a direct correlation between the filtered n/v ratio data signals and the selected gear of operation. Therefore, selected filtered n/v values would directly result in a determination of a selected gear. This information could then be relayed to the operator of the vehicle by a variety of selected indicator mechanism, such as a visual or auricular signal.

Figure 5:
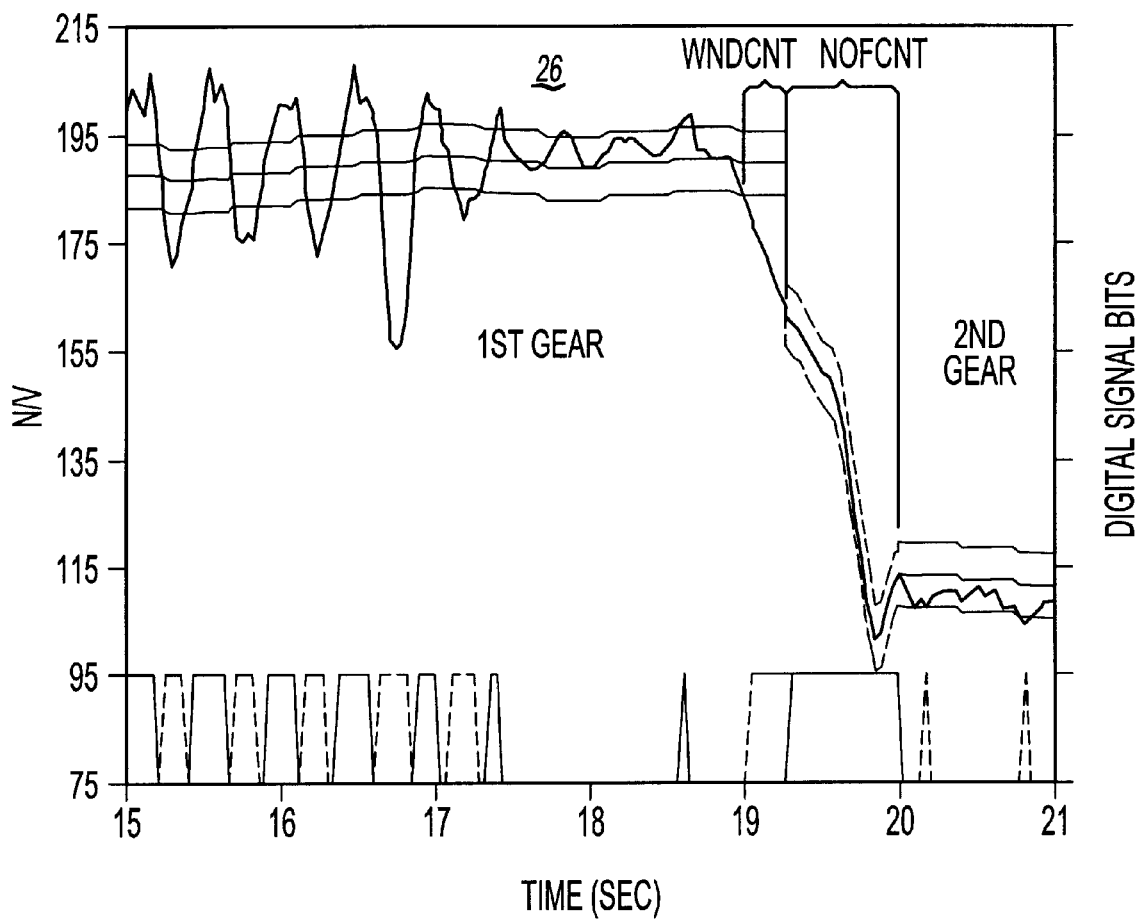
FIG. 5 is a more detailed graph of the filtered N/V ratio shown in FIG. 4.

An additional object of the present invention is to provide a quick transition from one gear to another during operation. Once the filtered n/v ratio has provided a stable output during a select gear, a method must be designed to allow for the filtered n/v ratio to deactivate during a gear change. As functionally described in FIG. 3 and graphically shown in plot 26 of FIG. 5, the deactivation of the filter routine results in a quick gear transition during shifting.

Initially a calabratable window period is determined and provides the signal for when the filter routine is deactivated during shifting. Following the storage of the filtered n/v signal based on the original unfiltered n/v ratio, a determination is made at step S6 as to whether the unfiltered n/v signal goes outside of the filtered n/v calabratable window. If the unfiltered n/v signal goes outside of the filtered n/v calabratable window a gear determination may be determined at step S7. This type of gear determination data may be provided within the framework of the microprocessor in the form of a data table or gear change timeline. A time period may be set by the calibrator to determine the necessary length of time for the unfiltered n/v value to be outside of the calibratable window before the filter routine is turned off. Once the specific time period is reached, the filtered n/v value is made equal to the unfiltered n/v feature by disabling the new filter feature, in otherwords the filter is turned off at step S8. The filtered n/v value and the unfiltered n/v value are maintained at equal levels for a calabratable "no filter" time period or until the n/v value of the next gear is reached. This allows for rapid n/v tracking, which must occur during gear change. At the conclusion of the "no filter" calabratable time period, the filter is reactivated and applied to the unfiltered n/v data signals within the next consecutive gear.

The filter routine described above continues throughout each gear transition provided by a manual transmission. Each of the cycles may be altered based on the preference of the calibrator. The present invention therefore provides a general application of a first order lag filter and the framework of calabratable time period throughout the filter routine. Each of the calibratable time periods may be altered based on the specific type, design or performance qualities of the transmission. Furthermore, the calibrator may be able to set specific standards based on desirable responses of the power train system during gear changes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed:

1. A method for identifying a current gear of a manual transmission, the method comprising the steps of:
    calculating raw ratios of engine speed based on engine speed data and vehicle speed data;
    selecting a calibratable time period;
    applying a first order lag filter to the raw ratios once for each calibratable time period such, that filtered ratios result;
    storing the filtered ratios to a memory device; and
    identifying current gears based on the filtered ratios retrieved from the memory device.

2. The method of claim 1 further including the step of increasing the calibratable time period to increase an averaging effect on the filtered ratios.

3. The method of claim 1 wherein the memory device comprises a random access memory.

4. A method for identifying a current gear of a manual transmission, the method comprising the steps of:
    calculating raw ratios of engine speed to vehicle speed based on engine speed data and vehicle speed data;
    filtering noise out of the raw ratios such that filtered ratios result;
    identifying current gears based on the filtered ratios;
    identifying gear changes based on the filtered ratios; and
    discontinuing the filtering step during the gear changes.

5. A method for identifying a current gear of a manual transmission, the method comprising the steps of:
    calculating raw ratios of engine speed to vehicle speed based on engine speed data and vehicle speed data;
    filtering noise out of the raw ratios such that filtered ratios result;
    selecting a calibratable window for the filtered ratios;
    determining when the unfiltered ratios are outside the calibratable window; and
    identifying current gears based on the filtered ratios.

6. A method for identifying a current gear of a manual transmission, the method comprising the steps of:
    calculating raw ratios of engine speed to vehicle speed based on engine speed data and vehicle speed data;
    filtering noise out of the raw ratios such that filtered ratios result;
    generating a correlation table associating selectable gears with known filtered ratios; and
    identifying current gears based on the filtered ratios and the correlation table.

7. The method of claim 1 further including the step of relaying the identified current gears to an operator of the manual transmission.

8. A method for filtering noise out of raw ratios of engine speed to vehicle speed, the method comprising the steps of:
    selecting a calibratable time period;
    applying a first order lag filter to the raw ratios once for each calibratable time period such that filtered ratios of engine speed to vehicle speed result; and
    storing the filtered ratios to a memory device.

9. The method of claim 8 further including the step of increasing the calibratable time period to increase an averaging effect on the filtered ratios.

10. The method of claim 8 further including the step of storing the filtered ratios to a random access memory.

11. A method for identifying a current gear of a manual transmission, the method comprising the steps of:
    calculating raw ratios of engine speed to vehicle speed based on engine speed data and vehicle speed data;
    selecting a calibratable time period;

applying a first order lag filter to the raw ratios once each calibratable time period such that filtered ratios result;

storing the filtered ratios to a random access memory;

selecting a calibratable window for the filtered ratios;

determining when the unfiltered ratios are outside the calibratable window such that gear changes are identified;

discontinuing application of the filter during the gear changes; and relaying the identified gear changes and current gears to an operator of the manual transmission.

12. The method of claim 11 further including the step of generating a correlation table associating selectable gears with known filtered ratios.

13. A manual transmission gear identification system comprising:

a microprocessor for calculating raw ratios of engine speed to vehicle speed based on engine speed data and vehicle speed data; and a first order lag filter for filtering noise out of the raw ratios such that filtered ratios result;

said microprocessor identifying current gears based on the filtered ratios.

14. The identification system of claim 13 further including a gear change indicator for relaying the identified current gears to an operator of the manual transmission.

15. The identification system of claim 13 further including a vehicle speed sensor for generating the vehicle speed data.

16. The identification system of claim 13 further including an engine speed sensor for generating the engine speed data.

* * * * *